March 30, 1943.    W. SHAW    2,315,278
AIR FILTER
Filed June 15, 1940    3 Sheets-Sheet 1
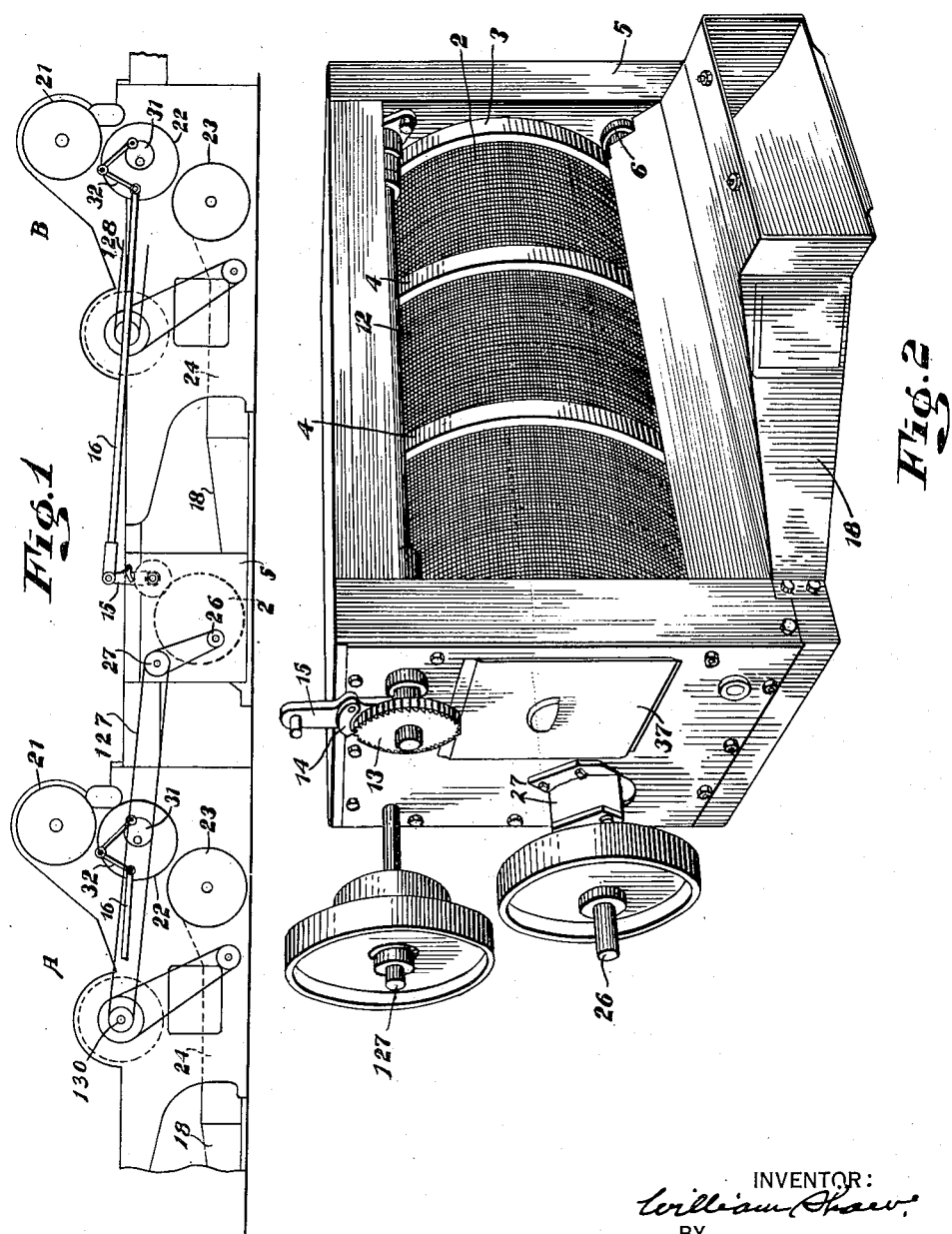
INVENTOR:
William Shaw.
BY
J. H. McCready,
ATTORNEY.

March 30, 1943    W. SHAW    2,315,278
AIR FILTER
Filed June 15, 1940    3 Sheets—Sheet 2

INVENTOR
William Shaw,
BY
ATTORNEY,

March 30, 1943.                    W. SHAW                    2,315,278
                                  AIR FILTER
             Filed June 15, 1940                    3 Sheets-Sheet 3

INVENTOR
                                                    William Shaw
                                                BY
                                                    J. H. McCready
                                                    ATTORNEY.

Patented Mar. 30, 1943

2,315,278

UNITED STATES PATENT OFFICE 2,315,278

AIR FILTER

William Shaw, Saco, Maine, assignor to Saco-Lowell Shops, Boston, Mass., a corporation of Maine Application June 15, 1940, Serial No. 340,749

6 Claims. (Cl. 183—63)

This invention relates to machines for filtering air and other gaseous fluids which can be handled in essentially the same manner. It is more especially concerned with apparatus of this type designed to satisfy the requirements of various textile machines used in the preparation of fibrous materials, such as cotton, asbestos, and others, for use in subsequent operations as, for example, spinning, although the invention is equally useful in other situations, especially those in which the air to be handled carries a substantial proportion of lint and fly.

As is well understood by those familiar with the preparation of raw fibrous materials for use in various fabricating operations, an early operation in that process is to separate the dirt, leaf, sticks, and other foreign materials, from the useful fiber. This operation is customarily performed in openers, beaters, pickers, and other machinery of an analogous nature, in which the cotton or other fibrous material being operated upon is conveyed in a current of air. If the air so utilized is to be returned again to the work room, or is to be re-circulated for use in conveying additional fiber, then it is important to remove the dirt, lint, fly, and the like, from such air stream. Furthermore, when the product being operated upon must be kept exceptionally clean, or when the air is to be discharged into the work room to be breathed by the operatives, then a very complete removal of foreign materials by filtering must be accomplished.

The present invention is especially concerned with these considerations as applied to cotton picking and similar machines. Usually the filter structure is used with a picker as a built-in part of the machine or as a corresponding part of one unit of a series of pickers, all operating on the same stream of cotton. I have found that if the air stream is to be cleaned up to a satisfactory degree for the discharge of the air into the picker room, an especially serious problem is to get rid of the very fine dirt, silica dust, and the like, which tends to pass through even a good filtering medium. To accomplish this object while handling the large volume of air necessary to satisfy the requirements of the beating and condensing operations in a picker and still maintain the dimensions of the filter within the limitations necessary to build it into the structure of a picker, has proved to be a very difficult problem. To devise a thoroughly practical solution for this problem forms the fundamental object of this invention.

The nature of the invention will be readily understood from the following description when read in connection with the accompanying drawings, and the novel features will be particularly pointed out in the appended claims.

In the drawings,

Figure 1 is a side view showing diagrammatically a plurality of pickers arranged in tandem and equipped with one or more air filters embodying the present invention;

Fig. 2 is a perspective view of a filter unit such as that sown in Fig. 1;

Fig. 4 is a sectional view of the filter approximately on the line 2—2, Fig. 3.

Figure 3:
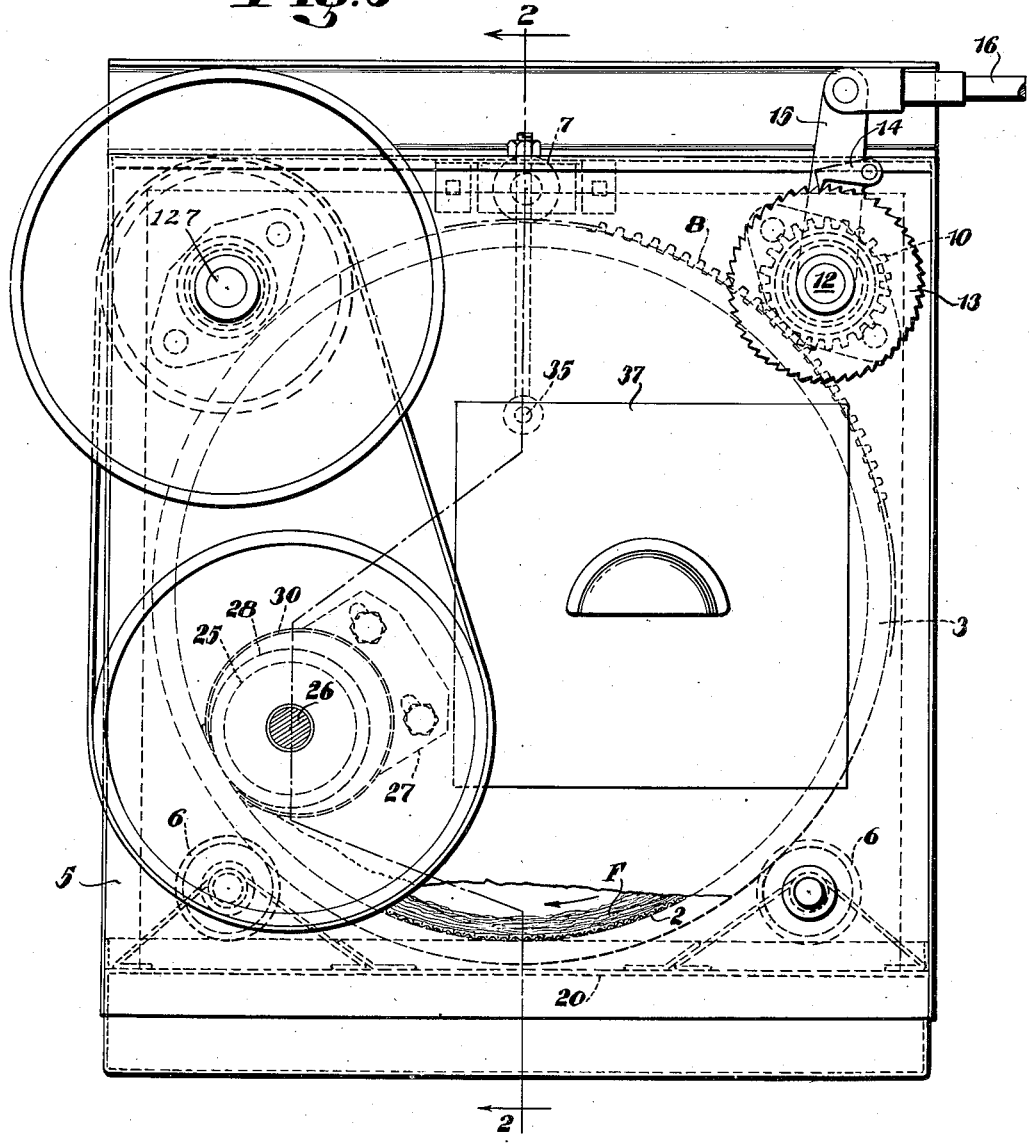
Fig. 3 is an end elevation of the filter structure shown in Fig. 2.

I have found that the filtering area can be very materially increased within the dimensions customarily occupied by an air filter in a picker and that a substantial increase in filtering efficiency can be accomplished by making the filtering element in the form of a cylinder, directing the air to be filtered into the interior of the drum, and causing it to flow outwardly through the filtering surface. In the construction shown in the drawings the screening or filtering cylinder is shown at 2. It comprises heavy circular end rings 3—3 and intermediate rings 4—4, Fig. 2, together with suitable longitudinal bars cooperating with said rings to form a frame work on which a wire mesh screen is mounted. While the nature of this screen necessarily will be determined in accordance with the requirements of particular installations, a construction which has proved satisfactory for use in pickers consists of an outer screen of relatively coarse mesh, say four meshes to the linear inch, both axially and circumferentially, and an inner screen of much finer mesh, say forty to the inch.

This screening cylinder or drum is mounted horizontally in a casing 5 for rotation around its own axis. As shown, the end rings 3—3 are externally supported on two lower rolls 6—6 and the upper edges of these rings run in contact with guide rolls 7, Figs. 3 and 4. Thus the interior of the drum is left free from any supporting elements. In order to drive the drum a ring gear 8, Fig. 4, is secured to the left-hand end ring 3, and it meshes with a pinion 10 secured on a shaft 12 which is mounted in suitable bearings bolted to the casing. The left-hand end, Fig. 2, of this shaft projects through the casing and has a ratchet wheel 13 secured fast to it, and a pawl 14 mounted on an arm 15, which swings on the shaft 12, is connected as by means of the rod 16, to any convenient source of power adapted for utilization to drive the drum step by step through this pawl and ratchet mechanism.

The casing 5 preferably is made up of pressed steel plates and shapes, bolted together, and it has hollow ends providing chambers 17—17, Fig. 4, which communicate directly with the opposite open ends of the cylinder 2. The air to be filtered is led into the bottom of this casing through an intake fitting 18, Fig. 2, the air so guided into the casing flowing around the ends of the bottom plate 20 and up into the chambers 17—17, and thence into the opposite ends of the cylinder. Those walls of the chambers 17—17 adjoining the cylinder are shaped to fit snugly around it and the joints between these walls and the end rings of the cylinder may be packed or sealed in any convenient manner.

Fig. 1 shows a typical installation in which the filter casing 5 is mounted between two picker units A and B arranged in tandem, the cotton discharged from the condenser of the picker A being fed toward the right across a feed table, or in any other manner, to the beater of the second unit B. The latter is equipped with the usual condenser screens 21 and 22 and when the machine is in operation air is drawn through them from the beater chamber, carrying the cotton with it, the suction required for this purpose being provided by a blower 23. The air exhausted by this blower is led through a conduit 24 to the intake fitting 18 of the filter and is discharged by it, as above described, into the opposite ends of the filtering cylinder 2.

This air stream carries a considerable proportion of lint and fly in addition to foreign materials of other kinds suspended in the air stream. As this current of air flows outwardly through the cylinder, the lint and fly is caught on the fine mesh inner screen, and after a very brief period of operation it accumulates as a loosely compacted fibrous layer which forms an excellent filtering medium. That is, the fibers are so loosely associated with each other in this mat or layer that the air flows through them relatively freely while they serve to catch, entangle and trap even very small particles of solid materials which the air stream tends to carry through the filtering surface. The thickness of this layer can be regulated by controlling the rate of revolution of the cylinder. Usually its rotation is made very slow in a cotton picker, say for example, one complete revolution in three-quarters of an hour or an hour.

It is necessary, however, to remove this accumulation of material screened out of the air stream in order to maintain the filter in an efficient operative condition, and for this purpose a mechanical conveyor is provided, preferably of the screw type. As best shown in Fig. 4, this conveyor comprises a cylindrical body 25 mounted on a shaft 26 which is supported in bearings 27—27 secured to opposite ends of the casing 5, and a rib 28 made of leather, rubber, or other suitable material, is wound spirally around the body 25. This screw element is substantially enclosed in a shield or tube 30, the tube, however, being open or slotted along the side thereof adjacent to the inner surface of the screen, so that the outer edges of the spiral rib 28 can run substantially in contact with the screening surface. The edge of the slot at the trailing edge or right-hand side, Fig. 3, of the casing is spaced from the screen 2 by a distance sufficient to admit the mat F of fibers, but the left-hand or leading edge of the shield 30 is positioned as close as practical to the screen. The cylinder revolves in a clockwise direction, as seen in Fig. 3, so that it carries the mat into the range of operation of the screw conveyor which, as it revolves, forces successive portions of this mat out of the cylinder, through the end chambers, and discharges them outside the machine.

For the purpose of driving the conveyor the shaft 26 may be belt connected to an adjacent shaft 127 which, in turn, is connected by a belt 128, Fig. 1, to the beater shaft 130 of the picker A, or to any other convenient source of power.

When the machine is installed as shown in Fig. 1, the ratchet and pawl mechanism for driving the cylinder may be driven by an eccentric 31 on the shaft of the lower condenser screen 22 of the picker B, this eccentric operating a bell crank lever 32, one arm of which is connected to the link or rod 16.

In running a heavy mat or layer of filtering fiber on the inner surface of the screen there is sometimes a tendency for a portion of it to fall away as it passes through the upper part of its path of travel. This difficulty can be avoided by locating the conveyor 25 at some point between the bottom of the cylinder and a horizontal plane through the axis of rotation of the cylinder. I have obtained the best results by positioning the conveyor approximately as shown in Fig. 3 where it is about 60° beyond the lowest point of the cylinder and acts on a rising portion of the filtering surface.

Figure 5:
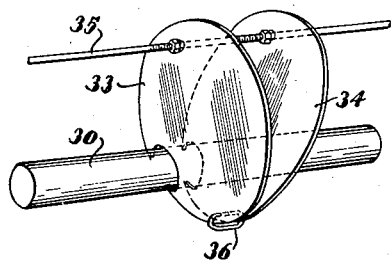
Fig. 5 is an angular view showing the deflectors used in the filter cylinder.

I have found that if the air to be filtered is allowed to flow substantially unimpeded into the cylinder 2, eddy currents or an undesirable turbulence is created at the central zone of the cylinder where the two incoming currents meet. This difficulty can, however, be avoided by mounting a partition comprising two disks 33 and 34, Figs. 4 and 5, inside the cylinder where it serves to deflect the currents of air and to produce a more uniform distribution of it over the filtering area. These two disks or deflectors are suspended on a bar 35 in a V-shaped relationship and each disk is mounted between nuts threaded on said bar so that they can be adjusted toward and from each other. The lower edges of the disk preferably are connected in some way, as by the link 36, Fig. 5. Hand holes are provided in opposite ends of the casing, normally closed by removable covers 37, so that the operator can reach into the cylinder from either end to adjust the nuts. The bar 35 is supported at its opposite ends by upright rods 38—38, Fig. 4.

With such an arrangement as that above described, I have found it possible so to increase the screening area of a cylinder mounted under the feed table of a picker in the preferred location, that the filter operates far more effectively than any of the prior art devices with which I am familiar. It can be made entirely automatic in its action, it requires less attention than any of the prior art constructions of which I have been able to learn, and the filter sheet carried on the inside of the cylinder can be maintained at such thickness that the speed of the air flowing through it will be reduced to a point much lower than has been possible heretofore. This has an extremely important effect on the operating efficiency of a filter of this type, since if the air speed is too high, it will carry with it very fine dust which is highly objectionable to the operators, and is definitely detrimental to their health. This filter can be run with its front and rear sides open to the surrounding atmosphere so that the filtered air is discharged directly into the room while still maintaining entirely satisfacfactory working conditions so far as freedom from dust and fly is concerned. Also, the casing is so constructed that the outer surface of the cylinder is completely exposed to the surrounding atmosphere, or, if desired, the area immediately opposite the slot in the conveyor shield 30 may be covered with a stationary flap or plate to prevent the discharge of dust through the portion of the screening surface cleaned by the conveyor, and to protect this area during the brief period required to deposit additional fiber on it. Also, the conveyor can be so adjusted relatively to the screening surface that a layer of thin but predetermined minimum thickness will always be present on it.

While I have herein shown and described a preferred embodiment of my invention, it will be evident that the invention is susceptible of embodiment in other forms without departing from the spirit or scope thereof.

Having thus described my invention, what I desire to claim as new is:

1. An air filter of the character described, comprising a filtering cylinder, a casing in which said cylinder is supported for rotation around its own axis, means for conducting air to be filtered into said cylinder where it passes outwardly through the filtering surface of the cylinder and leaves the material filtered out of the air stream on the inner surface of the cylinder, a screw conveyor mounted in said cylinder and extending parallel to the axis thereof in position to discharge said material collected on the inner surface and a shield enclosing the greater portion of said conveyor but slotted at the side adjacent to said surface to enable the conveyor to run approximately in contact with the filtering surface of the cylinder, the rearward edge of said shield being spaced farther from the screen than the forward edge of the shield.

2. An air filter of the character described, comprising a filtering cylinder, a casing in which said cylinder is supported for rotation around its own axis, means for conducting air to be filtered into said cylinder at opposite ends thereof where it passes outwardly through the filtering surface of the cylinder and leaves the material filtered out of the air stream on the inner surface of the cylinder, mechanism for removing said material from said surface, and two deflector plates positioned transversely in said cylinder approximately midway of its length where they divide the air space in the cylinder into two chambers, and means supporting said deflector plates in V-shaped relationship.

3. An air filter of the character described, comprising an approximately horizontal screening cylinder, a casing in which said cylinder is supported for rotation around its own axis, said casing having air inlet chambers communicating with the opposite ends of said cylinder and said ends being open, means for conducting air to be filtered into said chambers where it will flow inwardly through opposite ends of the cylinder and outwardly through the filtering surface thereof, rolls engaging the external surface of said cylinder and supporting it for said rotation, a partition positioned transversely in the cylinder at an intermediate point therein to divide the air space therein into two chambers, a ring gear on the end of said cylinder, sealing means between the end portions of said cylinder and the surrounding portions of said casing, mechanism operating through said ring gear to revolve said cylinder around its own axis, mechanical conveying means mounted in said cylinder for removing the material filtered out of the air stream and collected on the inner surface of said cylinder, and mechanism for driving said conveying apparatus.

4. An air filter of the character described, comprising a horizontal filtering cylinder, a casing in which said cylinder is supported for rotation around its own axis, means for conducting air to be filtered into said cylinder where it passes outwardly through the filtering surface of the cylinder and leaves the material filtered out of the air stream on the inner surface of the cylinder, mechanism for driving the cylinder at a speed sufficiently slow to maintain a filtering layer of fibrous material screened out of the air stream continuously covering substantially the entire filtering area of the cylinder, a screw conveyor positioned in said cylinder substantially in contact with said screening surface and operable to discharge said material from said surface, and means for driving said conveyor, said conveyor being positioned to operate on a rising portion of the filter surface after it has passed its lowermost position and before it reaches a level in the plane of the axis of rotation of the cylinder.

5. An air filter of the character described, comprising a horizontal filtering cylinder, a casing in which said cylinder is supported for rotation around its own axis, means for conducting air to be filtered into said cylinder where it passes outwardly through the filtering surface of the cylinder and leaves the material filtered out of the air stream on the inner surface of the cylinder, mechanism for driving the cylinder at a speed sufficiently slow to maintain a filtering layer of fibrous material screened out of the air stream continuously covering substantially the entire filtering area of the cylinder, a screw conveyor positioned in said cylinder substantially in contact with said screening surface and operable to discharge said material from said surface, and means for driving said conveyor, said conveyor being positioned to operate on a rising portion of the filter surface at a point approximately 60° beyond the lowest point of the cylinder.

6. An air filter of the character described, comprising a filtering cylinder, a casing in which said cylinder is supported for rotation around its own axis, means for conducting air to be filtered into said cylinder at opposite ends thereof where it passes outwardly through the filtering surface of the cylinder and leaves the material filtered out of the air stream on the inner surface of the cylinder, a screw conveyor mounted in said cylinder and extending lengthwise thereof in position to act directly on the accumulation of material filtered out of the air stream by the cylinder to remove said material from the inner surface of the cylinder, mechanism for driving said conveyor, a partition positioned transversely in said cylinder approximately midway of its length where it divides the air space in the cylinder into two chambers communicating, respectively, with the opposite ends of the cylinder, and means supporting said partition for adjustment lengthwise of said cylinder.

WILLIAM SHAW.